(12) United States Patent
Liu et al.

(10) Patent No.: US 6,506,480 B2
(45) Date of Patent: Jan. 14, 2003

(54) COLOR SHIFTING FILM WITH A PLURALITY OF FLUORESCENT COLORANTS

(75) Inventors: Yaoqi J. Liu, Maplewood, MN (US); James M. Jonza, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 134 days.

(21) Appl. No.: 09/785,652

(22) Filed: Feb. 16, 2001

(65) Prior Publication Data

US 2002/0114929 A1 Aug. 22, 2002

(51) Int. Cl.$^7$ .............................. B32B 3/00; B32B 3/10; B32B 5/00; B32B 7/00
(52) U.S. Cl. ..................... 428/201; 428/195; 428/203; 428/204; 428/206; 428/207; 428/212; 428/916; 359/1; 359/2; 359/502; 359/580; 359/589
(58) Field of Search .................. 928/195, 201, 928/203, 204, 206, 207, 212, 916; 359/1, 2, 502, 580, 589

(56) References Cited

U.S. PATENT DOCUMENTS

| ,540,768 A | 6/1895 | Western |
| 3,124,639 A | 3/1964 | Kahn ........................... 88/65 |
| 3,610,729 A | 10/1971 | Rogers ........................ 350/157 |
| 3,711,176 A | 1/1973 | Alfrey, Jr. et al. ............... 350/1 |
| 3,801,429 A | 4/1974 | Schrenk et al. .............. 161/181 |
| 3,860,036 A | 1/1975 | Newman, Jr. ................. 138/45 |
| 4,162,343 A | 7/1979 | Wilcox et al. ............... 428/212 |
| 4,310,584 A | 1/1982 | Cooper et al. .............. 428/212 |
| 4,446,305 A | 5/1984 | Rogers et al. .............. 528/348 |
| 4,520,189 A | 5/1985 | Rogers et al. .............. 528/331 |
| 4,521,588 A | 6/1985 | Rogers et al. .............. 528/363 |
| 4,525,413 A | 6/1985 | Rogers et al. .............. 428/212 |
| 4,652,464 A | 3/1987 | Ludlum et al. |
| 4,720,426 A | 1/1988 | Englert et al. ............... 428/344 |
| 5,103,337 A | 4/1992 | Schrenk et al. ............. 359/359 |
| 5,188,760 A | 2/1993 | Hikmet et al. ......... 252/299.01 |
| 5,211,878 A | 5/1993 | Reiffenrath et al. .... 252/299.63 |
| 5,235,443 A | 8/1993 | Barnik et al. .................. 359/37 |
| 5,269,995 A | 12/1993 | Ramanathan et al. ....... 264/171 |
| 5,294,657 A | 3/1994 | Melendy et al. ............. 524/270 |

(List continued on next page.)

FOREIGN PATENT DOCUMENTS

| EP | 0 657 297 | 6/1995 |
| WO | WO 95/27919 | 4/1995 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 97/01440 | 1/1997 |
| WO | WO 97/01774 | 1/1997 |
| WO | WO 99/36248 | 7/1999 |
| WO | WO 99/36258 | 7/1999 |
| WO | WO 99/36262 | 7/1999 |
| WO | WO 00/24580 | 5/2000 |

OTHER PUBLICATIONS

Schrenk et al., Nanolayer polymeric optical films, Tappi Journal, pp. 169–174, Jun., 1992.
Weber et al., "Giant Birefringent Optics in Multilayer Polymer Mirrors", Science, vol. 287, Mar. 31, 2000, pp. 2451–2456.

*Primary Examiner*—Vivian Chen
(74) *Attorney, Agent, or Firm*—Stephen C. Jensen

(57) ABSTRACT

Disclosed are articles having a color shifting film and indicia located behind the color shifting film. At least a first and second colored portion are arranged as a foreground and background of the indicia. The first portion includes a first fluorescent colorant and the second portion includes a different second fluorescent colorant. At least one of the colored portions is patterned. Bright fluorescent emission is visible from the different colorants over different angular ranges to produce high contrast reversal or change.

17 Claims, 8 Drawing Sheets

U.S. PATENT DOCUMENTS

| | | |
|---|---|---|
| RE34,605 E | 5/1994 | Schrenk et al. ............. 359/359 |
| 5,316,703 A | 5/1994 | Schrenk ...................... 264/1.3 |
| 5,319,478 A | 6/1994 | Fijnfschilling et al. ....... 359/53 |
| 5,360,659 A | 11/1994 | Arends et al. .............. 428/216 |
| 5,389,324 A | 2/1995 | Lewis et al. ................ 264/171 |
| 5,440,446 A | 8/1995 | Shaw et al. |
| 5,448,404 A | 9/1995 | Schrenk et al. ............. 359/584 |
| 5,486,935 A | 1/1996 | Kalmanash ................... 359/37 |
| 5,486,949 A | 1/1996 | Schrenk et al. ............. 359/498 |
| 5,612,820 A | 3/1997 | Schrenk et al. ............. 359/498 |
| 5,629,055 A | 5/1997 | Revol et al. ................... 428/1 |
| 5,656,360 A | 8/1997 | Faykish et al. |
| 5,686,979 A | 11/1997 | Weber et al. ................ 349/96 |
| 5,699,188 A | 12/1997 | Gilbert et al. ............. 359/584 |
| 5,700,077 A | 12/1997 | Dreyer, Jr. et al. |
| 5,721,603 A | 2/1998 | De Vaan et al. ............ 349/194 |
| 5,744,534 A | 4/1998 | Ishiharada et al. .......... 524/442 |
| 5,751,388 A | 5/1998 | Larson ........................ 349/96 |
| 5,767,935 A | 6/1998 | Ueda et al. ................. 349/112 |
| 5,770,306 A | 6/1998 | Suzuki et al. ............... 428/328 |
| 5,783,120 A | 7/1998 | Ouderkirk et al. .......... 264/134 |
| 5,793,456 A | 8/1998 | Broer et al. .................. 349/98 |
| 5,808,794 A | 9/1998 | Weber et al. ............... 359/487 |
| 5,825,542 A | 10/1998 | Cobb, Jr. et al. ........... 359/487 |
| 5,825,543 A | 10/1998 | Ouderkirk et al. .......... 359/494 |
| 5,877,895 A | 3/1999 | Shaw et al. |
| 5,881,196 A * | 3/1999 | Phillips ....................... 385/127 |
| 5,882,774 A | 3/1999 | Jonza et al. ................. 428/212 |
| 5,940,149 A | 8/1999 | Vanderwerf .................... 349/5 |
| 5,962,114 A | 10/1999 | Jonza et al. ................. 428/212 |
| 5,965,247 A | 10/1999 | Jonza et al. ................. 428/212 |
| 6,010,751 A | 1/2000 | Shaw et al. |
| 6,024,455 A | 2/2000 | O'Neill et al. |
| 6,045,894 A | 4/2000 | Jonza et al. |

\* cited by examiner

COLOR SHIFTING FILM WITH A PLURALITY OF FLUORESCENT COLORANTS

FIELD OF THE INVENTION

The present invention relates generally to films and other articles that incorporate information whose appearance is highly dependent upon viewing angle.

BACKGROUND OF THE INVENTION

Films that incorporate directional images—images that are viewable at some viewing geometries and not others—are generally known. U.S. Pat. No. 6,024,455 (O'Neill et al.), for example, discloses reflective articles in which a multilayer film covers a patterned retroreflective layer. The patterned retroreflective layer can include an indicia layer having patterned regions comprising conventional inks, dyes, or other substances which are substantially opaque to some wavelengths but transparent to others. Such films, however, require specialized lighting arrangements for optimal viewing.

PCT Publication WO 99/36258 (Weber et al.) discloses, among other things, color shifting films with printed indicia, and optical brighteners such as dyes that absorb in the UV and fluoresce in the visible region of the color spectrum. Such articles can also provide images whose appearance changes with viewing geometry, particularly where the printed indicia is provided on a back side of the color shifting film with respect to an observer. Advantageously, such articles can be viewed under ordinary diffuse lighting conditions, such as in a typical office environment.

BRIEF SUMMARY

In the search for always different and visually impressive product constructions, applicants have discovered new and useful combinations of color shifting films and fluorescent colorants. For example, applicants describe herein embodiments in which at least a first and second colored portion are disposed behind a color shifting film, such portions comprising respectively first and second different fluorescent colorants. The first and second colored portion define indicia. The properties of the color shifting film and of the first and second fluorescent colorants can be selected so that at a first angle fluorescent emission from only the first colorant is visible through the film. At a second angle, fluorescent emission from the second colorant is visible through the film. If fluorescent emission from the first colorant is not visible through the film at the second angle, a third angle may exist at which fluorescent emission from both colorants are visible through the film. A fourth angle may also exist at which fluorescent emission from neither colorant is visible through the film. By arranging the first and second colored portions as a foreground and background of the indicia, these properties can produce highly visible indicia with dramatic contrast changes as a function of angle.

BRIEF DESCRIPTION OF THE DRAWINGS

In the figures, like reference numerals indicate like elements.

DETAILED DESCRIPTION OF THE ILLUSTRATIVE EMBODIMENTS

Figure 1:
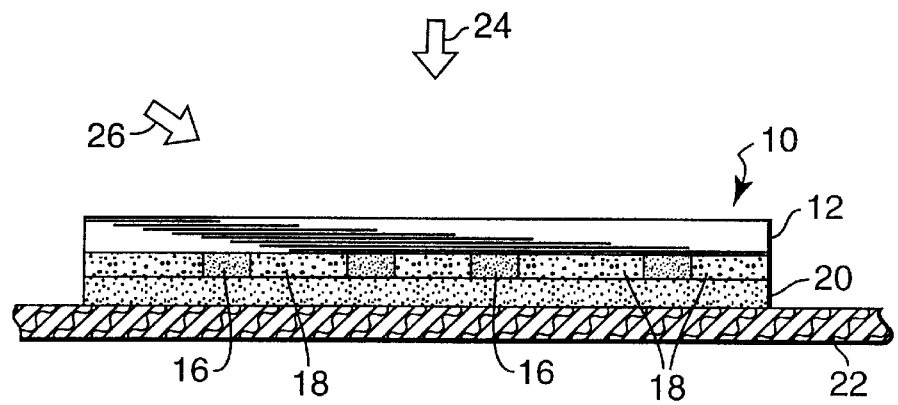
FIG. 1 is a sectional view of an article having a color shifting film and a first and second colored portion disposed behind the film which form indicia, the article being adhered to a substrate.

In FIG. 1, an article 10 includes a color shifting film 12 and indicia 14 (see FIGS. 2, 3) disposed behind the film 12 and viewable through the film 12 for at least some viewing and/or illumination geometries. The indicia 14 is made up of or defined by at least a first colored portion 16 and a second colored portion 18. As shown best in FIGS. 1–3, portions 16, 18 are patterned in complementary fashion so as to define the indicia 14, which in this embodiment is a single letter "W". Note that FIG. 1 corresponds roughly to a sectional view taken along axis 1—1 in FIGS. 2–3, which are drawn to a somewhat smaller scale than FIG. 1. Article 10 also includes an optional adhesive layer 20, which preferably comprises a conventional pressure-sensitive adhesive (PSA), but alternatively can comprise a heat-activated adhesive or other suitable adhesive. Adhesive layer 20 secures the article 10 to an optional substrate 22. If desired, substrate 22 can form part of the article 10. Depending upon the intended use of the article 10, substrate 22 can itself comprise a wide variety of different articles, such as a document, sheet of paper, rigid or flexible sign backing, or rigid or flexible window material if some illumination is desired from the back of article 10. To the extent any light is transmitted through the combination of color shifting film 12 and indicia 14, such light can be absorbed, reflected diffusely or specularly, or transmitted by substrate 22.

The color shifting film 12 has the property of transmitting different wavelengths of light as a function of the angle such light impinges on the film. The transmission properties may also be polarization dependent, even at normal incidence. In this regard, film 12 can be a polarizer, a mirror, or a mirror having substantial polarizing properties. Preferred films 12 have a multitude of alternating polymer layers arranged into a multitude of unit cells, each unit cell effective to reflect light at a wavelength twice the optical thickness of such unit cell. Such films can be made by co-extrusion of two or more polymers forming an interleaved stream of materials. The cast coextruded film can be subsequently thinned and oriented by stretching uniaxially or biaxially to form a finished reflective polarizer or mirror. Preferably, at least one of the polymers is capable of strain-induced birefringence so that the indices of refraction change on stretching. The unit cells, which can each include two, three, or more individual polymer layers, are typically also arranged to have an optical thickness gradient across the thickness of the film 12 so that a relatively wide spectral band ("reflection band") is reflected by the film. Boundaries of the reflection band are referred to herein as band edges—spectral transitions from high reflectivity (low transmission) to low reflectivity (high transmission) or vice versa. It is also known to tailor the thickness profile of the unit cells to sharpen the band edges. These and other aspects of suitable color shifting films are described in one or more of U.S. Pat. No. 5,882,774 (Jonza et al.); U.S. Pat. No. 6,024,455 (O'Neill et al.); and U.S. patent application Ser. No. 09/006,591 entitled "Color Shifting Film" (Weber et al.), filed Jan. 13, 1998. Reference is also made to U.S. Pat. Nos. 5,103,337 (Schrenk et al.) (reissued as Re. 34,605) and U.S. Pat. No. 5,360,659 (Arends et al.) for discussions of unit cells having more than two individual layers and/or more than two unique polymer materials.

Conventional inorganic multilayer films—made for example by vacuum deposition of two inorganic dielectric materials sequentially in a multitude of layers on a glass or other suitable substrate, or alternating layers of inorganic materials and organic polymers (see, e.g., U.S. Pat. No. 5,440,446 (Shaw et al.), U.S. Pat. No. 5,877,895 (Shaw et al.), and U.S. Pat. No. 6,010,751 (Shaw et al.))—can also be used as the color shifting film 12. Compared to these alternative multilayer films, preferred polymeric films described in the preceding paragraph have the added benefit of being able to maintain the integrity of their band edges over substantially all incidence angles and regardless of polarization of light, by controlling the out-of-plane (z-index) index of refraction of adjacent layers within the film. Preferably, the difference $\Delta n_z$ in index of refraction along the z-axis of adjacent polymer layers within a unit cell is less than the maximum index difference in the plane of the film (i.e., $\Delta n_x$ or $\Delta n_y$) between such adjacent layers, more preferably less than 0.5 or 0.2 times such maximum in-plane index difference, and can also preferably be substantially zero. These conditions help maintain the shape of the band edge even as the reflection band shifts in wavelength or color with changing incidence angle, which corresponds visually to high color saturation over a wide range of incidence angles. Suitable films are available from 3M Company (St. Paul, Minn., USA) under the designation 3M™ Radiant Light Film.

Coextruded polymeric films whose layers are not oriented, and thus are substantially isotropic in refractive index, can also be used for the color shifting film. Such films are described, for example, in U.S. Pat. No. 3,801,429 (Schrenk et al.), U.S. Pat. No. 4,162,343 (Wilcox et al.), and U.S. Pat. No. 4,310,584 (Cooper et al.).

Figure 2:
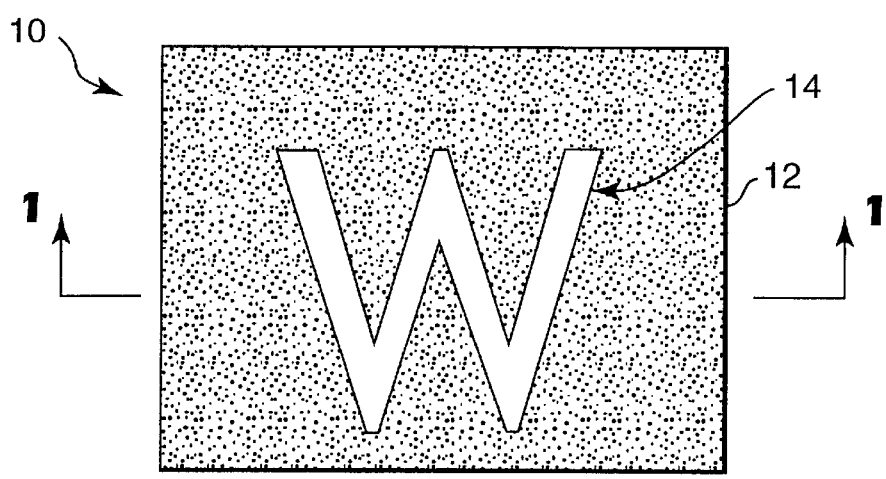
FIG. 2 is a front view of the article of FIG. 1 from one viewing angle, where speckling is used to indicate a bright fluorescent color.
Figure 3:
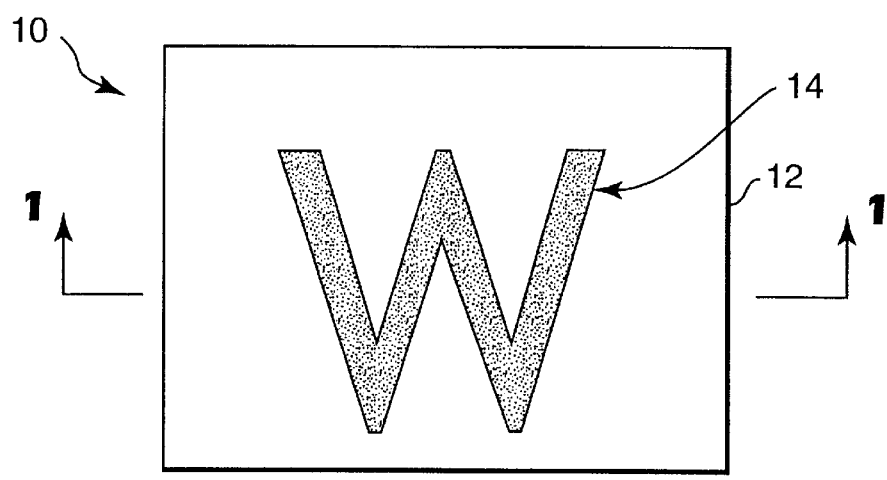
FIG. 3 is a front view of the article of FIG. 1 from another viewing angle, where speckling is used to indicate a bright fluorescent color.

The first colored portion 16 is patterned to form the foreground of a letter "W", and is disposed behind color shifting film 12. Other letters, symbols, or shapes which convey information are also contemplated. Importantly, portion 16 includes a fluorescent colorant. The term "colorant" as used herein means any pigiment, dye, or other substance or combination of substances used to impart hue or chroma to an article. The term "fluorescent" refers to the property of emitting light at one wavelength (or band of wavelengths) as a result of the absorption of light at a different (and typically shorter) wavelength (or band of wavelengths). The wavelength range of emitted fluorescent light is referred to as an emission band; that of the absorbed light is referred to as an excitation band. By proper selection of fluorescent colorant and color shifting film, light in the emission band can be substantially transmitted through the color shifting film at some angles. In some embodiments light in the emission band is substantially reflected by the color shifting film (and therefore blocked from reaching the eye of an observer) at other angles. Additionally or alternatively, if a highly directional light source is used, light in the excitation band can be blocked from reaching the fluorescent colorant at some angles but transmitted to the Fluorescent colorant at other angles. Arrows 24,26 shown in FIG. 1 represent a normal-incidence viewing angle and an oblique viewing angle respectively. At one of these angles, color shifting film 12 transmits the fluorescent emission of first colored portion 16, yielding a bright "W" (FIG. 3). At the other angle, color shifting film 12 may substantially block light in the emission band so that the "W" is relatively dark (FIG. 2).

The preceding discussion of course assumes that the fluorescent colorant in colored portion 16 is able to be excited by absorption of light in the excitation band. Such excitation can be achieved in a number of ways depending upon the intended application.

In some applications no significant amount of light is generated from behind the article 10. In those cases excitation light passes through the color shifting film 12 before reaching first colored portion 16. Some color shifting films 12 can effectively transmit the excitation light only for some directions of incidence and/or only for some polarizations. Such selective transmission of excitation light can be used in a specialized procedure to interrogate the article: one light beam having the appropriate angular and/or polarization properties is alternated with another light beam not having those properties, and the visual response (fluorescent emission or lack thereof at a suitable observation angle) is monitored. Alternatively, the application may be one in which the article 10 is exposed to light impinging on its front surface from substantially all angles and polarizations—such as is found in typical office environments—in which case a sufficient amount of light in the excitation band, and having the appropriate angular and/or polarization properties, will be present to produce fluorescence in the portion 16. Other color shifting films 12 can effectively transmit excitation light for substantially all or at least a wide range of incidence angles and/or polarizations. For those films, a comparatively greater amount of ambient light will pass through the color shifting film to produce a brighter fluorescent emission.

In some applications a source of light, such as a backlight or other lamp, is employed behind the article 10. In those cases any materials or elements disposed behind portion 16 are simply selected to have an aggregate transmission for light in the excitation band sufficient to produce the desired fluorescent effect in portion 16.

Article 10 also includes second colored portion 18 disposed behind color shifting film 12. As shown in FIG. 1, portion 18 can be patterned in a complementary fashion to portion 16. Alternatively, for simplicity of manufacturing, only one of portions 16,18 can be patterned, and the other portion can be unpatterned. In that case the unpatented portion can for instance be printed in a continuous layer to cover the patterned portion in some places and to extend between parts of the patterned portion in other places. In another manufacturing approach, the patterned portion can be printed on top of the continuous unpatterned portion and the resulting combination laminated to or otherwise placed behind color shifting film 12. In still another approach the patterned portion can be printed to the back side of the color shifting film, and the unpatterned portion can simply be positioned behind that combination. Conventional coating processes can be used to apply the colored portion(s) to the film 12, including without limitation flexographic printing techniques.

If the article includes an unpatterned adhesive layer 20, such layer can replace the first or second colored portions 16,18 by inclusion of the appropriate fluorescent and, if desirable, non-fluorescent colorants.

As shown in FIGS. 1–3, portion 18 forms a background for the indicia 14. Importantly, portion 18 also includes a fluorescent colorant, but differing from the fluorescent colorant of portion 16 preferably by its emission spectrum. That is, portion 18 preferably fluoresces at a substantially different color than that of portion 16. The different emission wavelengths can be coordinated with the properties of the color shifting film 12 such that bright fluorescent colors appear or disappear with changing angle to enhance visibility and contrast of the indicia 14. For example, at one viewing angle the color shifting film 12 may substantially block fluorescent emission from portion 16 but substantially transmit fluorescent emission from portion 18. This is depicted in FIG. 2, where stippling is used to indicate a bright colored appearance and non-stippled areas indicate a darkened appearance. At another angle the color shifting film 12 may process the fluorescent emissions in the opposite sense, resulting in a reverse contrast image of a different color as depicted in FIG. 3.

Portions 16,18 can also include non-fluorescent pigments, dyes, inks, or other colorants—i.e., colorants that do not produce fluorescent emission noticeable to an ordinary observer when exposed to expected light levels for the particular application.

Figure 4:
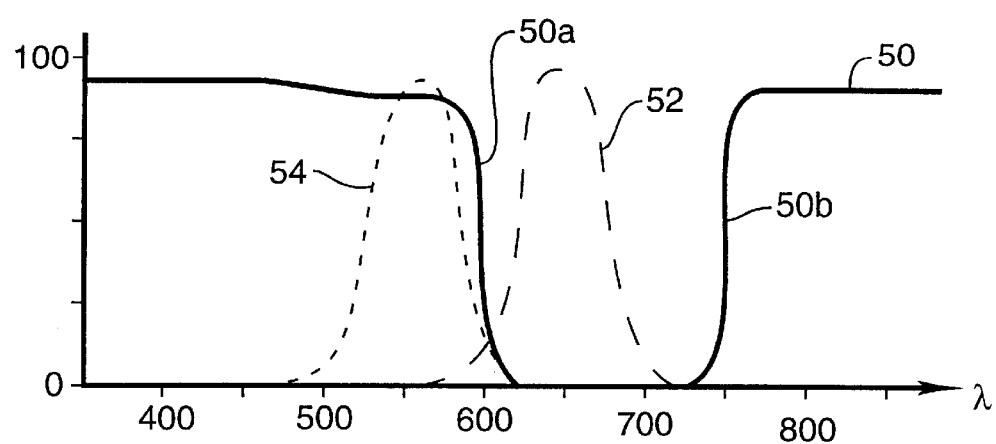
FIG. 4 is an idealized and simplified composite graph depicting spectral properties of the first and second colored portions, and of the color shifting film at one viewing angle.
Figure 5:
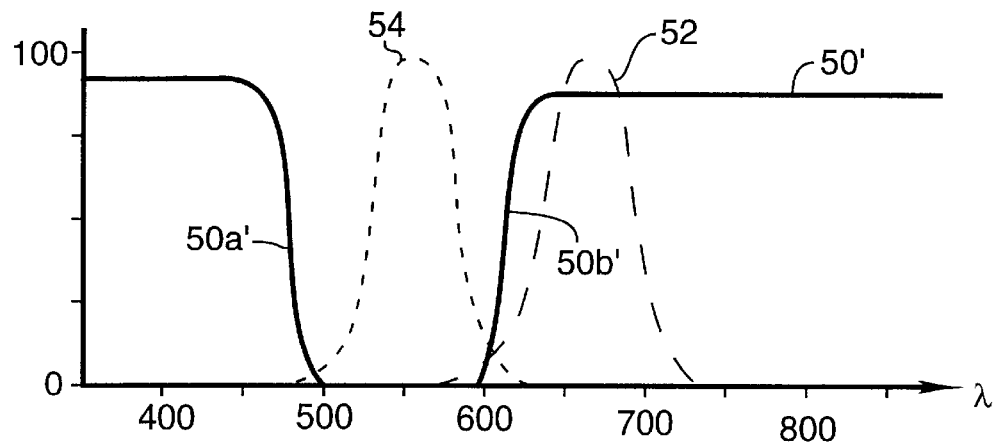
FIG. 5 is an idealized and simplified composite graph depicting spectral properties of the first and second colored portions, and of the color shifting film at another viewing angle.

FIGS. 4 & 5 are idealized, simplified composite graphs that depict spectral properties of the first and second colored portions, and of the color shifting film for a particular embodiment. For all curves shown, the x-axis represents the wavelength of light λ in nanometers (nm), with the visible region extending roughly from 400 to 700 nm. Curve 50 (FIG. 4) represents the spectral transmission of color shifting film 12 at normal incidence, and curve 50' (FIG. 5) represents its transmission at an oblique angle of incidence. These curves may be for a particular polarization of light, or instead an average over all polarizations. For these curves, the y-axis represents percent transmission, from 0% to 100%. If the color shifting film 12 comprises the preferred polymeric multilayer films described above, then the specular reflectivity at a particular wavelength is substantially 100% minus the percent transmission, since absorption in the films is typically much less than 1% for most wavelengths of interest. Curves 52 and 54 represent the effective reflectivity (reflectivity plus fluorescent intensity) of colored portions 16, 18 respectively, measured by themselves in the absence of any color shifting film. For curves 52,54, the y-axis represents effective reflectivity in arbitrary units. Curves 52,54 are roughly to scale with respect to each other. However, the relative heights of the curves are not intended to be exact, and all curves are idealized for ease of discussion.

At normal incidence (FIG. 4), the color shifting film 12 has a low transmission in a reflectance band bounded by band edges 50a, 50b as shown. Outside the reflectance band, the film has high transmission. At this geometry, therefore, film 12 substantially blocks light associated with colored portion 16 (curve 52) but substantially transmits light associated with colored portion 18 (curve 54). The viewer sees high contrast indicia with a bright background portion of one color and a darkened foreground portion as depicted in FIG. 2. Note that the film 12 substantially transmits light al shorter wavelengths than the curves 52,54, where excitation bands for the fluorescent colorants would normally lie.

Figure 5A:
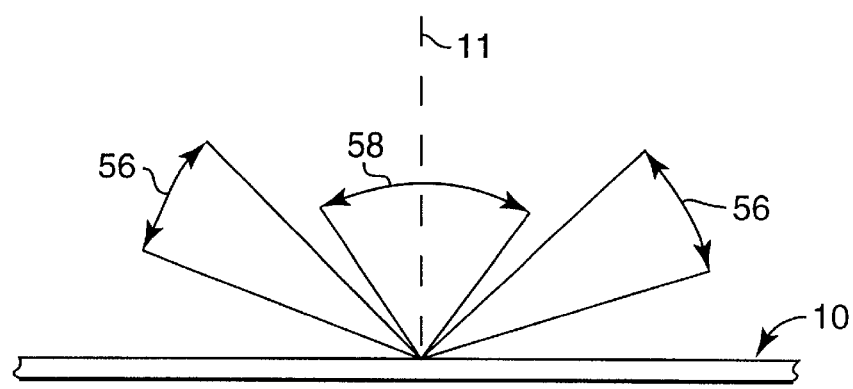
FIGS. 5a, 6a, 7a, and 8a are side views of the embodiments of FIGS. 4 & 5, FIG. 6, FIG. 7, and FIG. 8 respectively showing idealized viewing ranges for the different fluorescent colorants.

At a high angle of incidence (FIG. 5), the reflectance band and associated band edges, now labeled 50a' and 50b', have shifted to shorter wavelengths—hence the term color shifting film to describe the accompanying shift in transmitted light. At this geometry, light from colored portion 16 (curve 52) is substantially transmitted by the film 12, but light from portion 18 (curve 54) is substantially blocked. The viewer again sees high contrast indicia, but now with a darkened background portion and a bright foreground portion as depicted in FIG. 3. Depending upon the spectral width of the reflectance band and the spacing and width of curves 52,54, at certain incidence angles intermediate that of FIGS. 4 and 5 the foreground and background portions can both be bright or both be dark. At angles greater than that of FIG. 5, band edge 50b' may shift sufficiently to shorter wavelengths such that both foreground and background portions are bright. This angular behavior is illustrated in FIG. 5a, where 56 indicates angular ranges where fluorescent emission from first colored portion 16 (curve 52) is substantially visible to the observer, and 58 is analogous for colored portion 18 (curve 54). An axis 11 in FIG. 5a represents an axis normal to the article 10.

For maximum contrast shift, colored portions 16, 18 are arranged as foreground and background of a particular indicia as described above. Additionally, portion 16 can be used (as either a foreground or background) to define one indicia and portion 18 can be used (either as a foreground or background) to define a second independent indicia.

Figure 6:
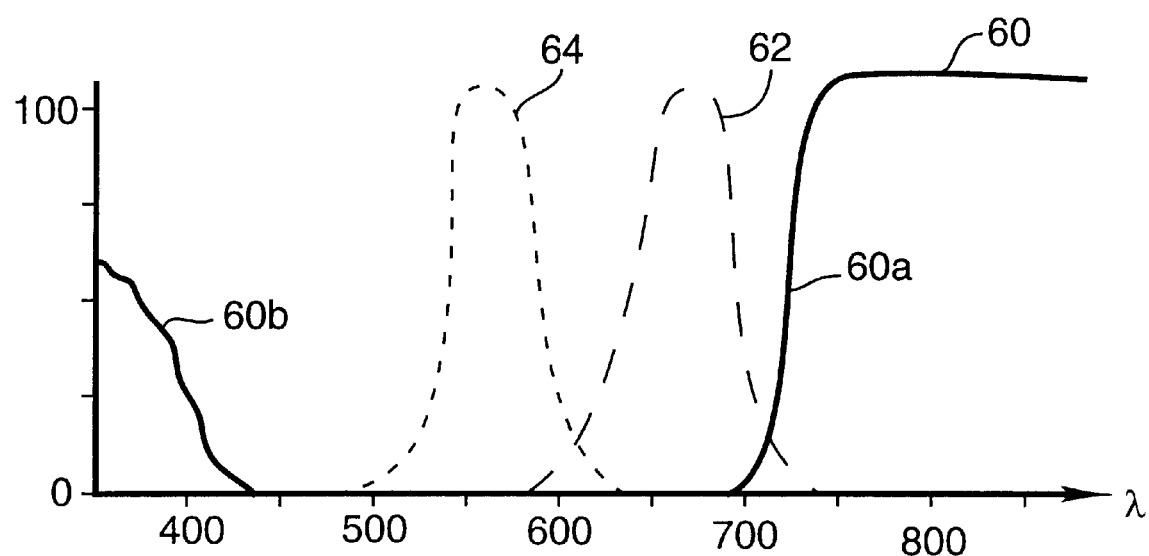
FIGS. 6, 7, and 8 are idealized and simplified composite graphs depicting spectral properties of the first and second colored portions, and of the color shifting film at one viewing angle, for three different embodiments.

FIG. 6 is an idealized, simplified composite graph for normal incidence similar to FIG. 4, but for a different embodiment having different first and second colored portions 16,18, and a different color shifting film 12. Curve 60 represents the spectral transmission of color shifting film 12 at normal incidence. Curve 60 includes band edges 60a, 60b. Curves 62,64 represent the effective reflectivity (as discussed above) of colored portions 16, 18 respectively. The overall spectral distributions of curves 62,64 represent substantially different colors. Furthermore, at normal incidence the film 12 substantially blocks light associated with colored portions 16,18, so that both are substantially invisible. Indeed, color shifting film 12 (and article 10) in this embodiment have the appearance of a silvery visible mirror since film 12 reflects over substantially the entire visible spectrum. The film 12 also has substantial transmission at shorter wavelengths (see band edge 60b) to permit excitation light to pass through to the colored portions.

Figure 6A:
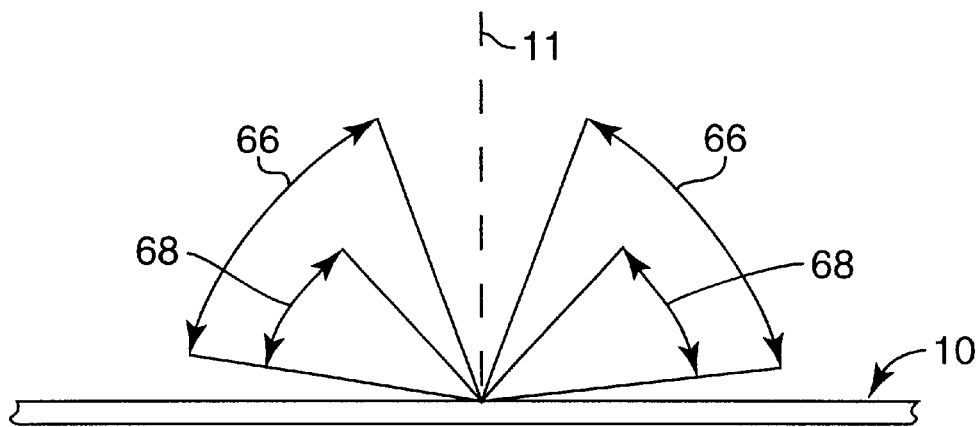

At progressively higher observation angles the blue shift of band edge 60a allows first the foreground (curve 62) and then the background (curve 64) to appear bright to the viewer. Thus, the article 10 which appears substantially mirror-like at normal viewing angles reveals indicia 14 with changing contrast and color at higher observation angles. The angular behavior is illustrated in FIG. 6a, where 66 indicates angular ranges where fluorescent emission from first colored portion 16 (curve 62) is substantially visible to the observer, and 68 is analogous for colored portion 18 (curve 64).

Figure 7:
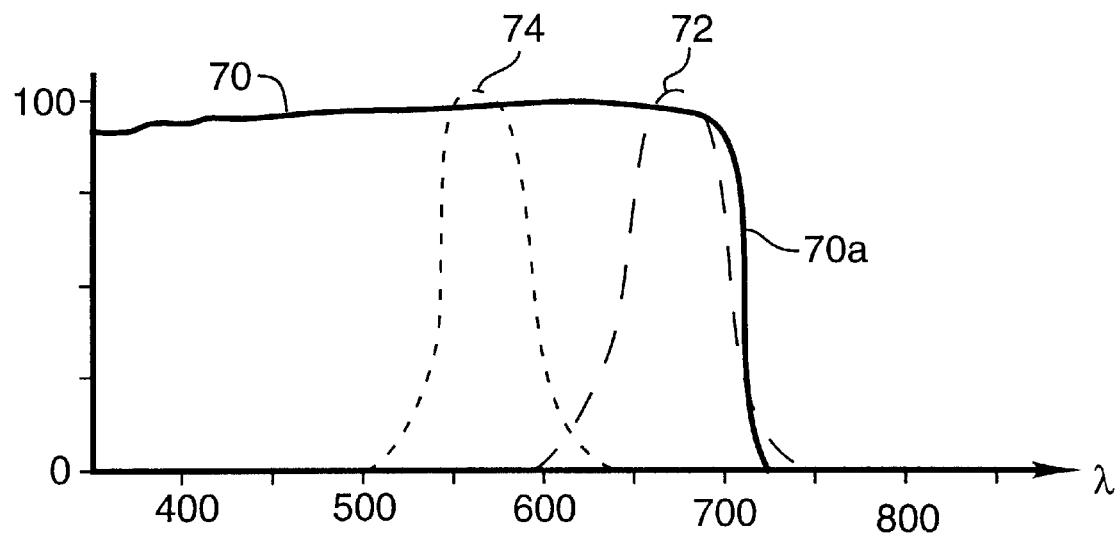

FIG. 7 is an idealized, simplified composite graph for normal incidence similar to FIG. 6, but for still another embodiment having different first and second colored portions 16,18, and a different color shifting film 12. Curve 70 represents the spectral transmission of color shifting film 12 at normal incidence. Curve 70 includes band edge 70a. Curves 72,74 represent the effective reflectivity (as discussed above) of colored portions 16, 18 respectively. The overall spectral distributions of curves 72,74 represent substantially different colors. In this embodiment, at normal incidence the film 12 substantially transmits light from both curves 72,74 to yield a high contrast appearance with bright foreground and bright background of different colors. Indeed, at normal incidence the film 12 has the appearance of a substantially clear film, because it has high transmission throughout the visible spectrum. Film 12 also transmits light at wavelengths shorter than curves 72,74, where the excitation bands of the fluorescent colorants normally lie.

Figure 7A:
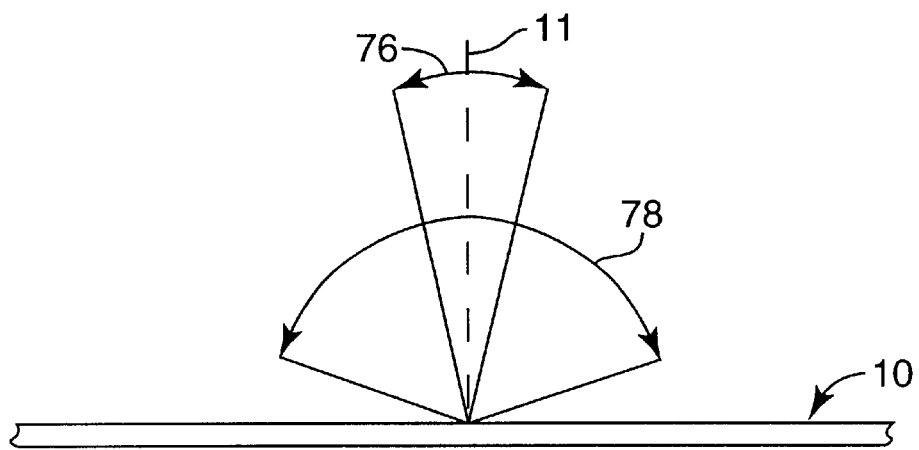

For oblique angle observation, band edge 70a shifts towards the blue (shorter wavelengths) with increasing angle. First, light from colored portion 16 (curve 72) becomes blocked by film 12, followed by light from colored portion 18 (curve 74). Again the viewer sees indicia 14 in high contrast with changing bright or dark colors as a function of angle. FIG. 7a depicts the angular behavior graphically: 76 indicates angular ranges where fluorescent emission from first colored portion 16 (curve 72) is substantially visible to the observer, and 78 is analogous for colored portion 18 (curve 74).

Figure 8:
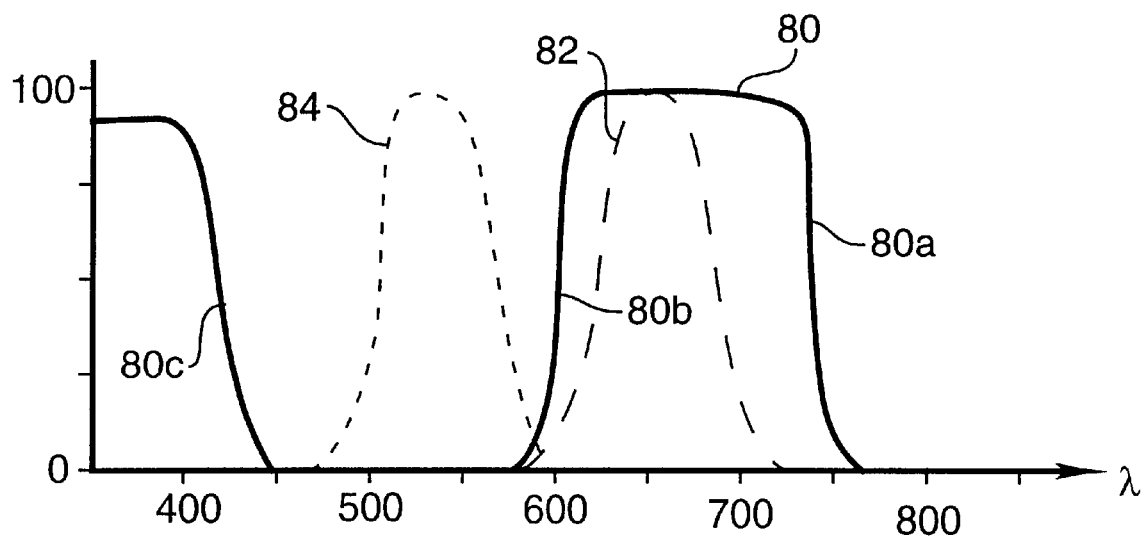

FIG. 8 is yet another idealized, simplified composite graph for normal incidence similar to FIG. 7, but for still another embodiment having different first and second colored portions 16,18, and a different color shifting film 12. Curve 80 represents the spectral transmission of color shifting film 12 at normal incidence. Curve 80 includes band edges 80a, 80b, 80c. Curves 82,84 represent the effective reflectivity (as discussed above) of colored portions 16, 18 respectively. The overall spectral distributions of curves 82,84 represent substantially different colors. In this embodiment, at normal incidence the film 12 substantially transmits light from curves 82 but substantially blocks light from curve 84 to yield a high contrast appearance with bright foreground and dark background. Note that film 12 transmits light at relatively short wavelengths (see band edge 80c), where the excitation bands of the fluorescent colorants would lie.

Figure 8A:
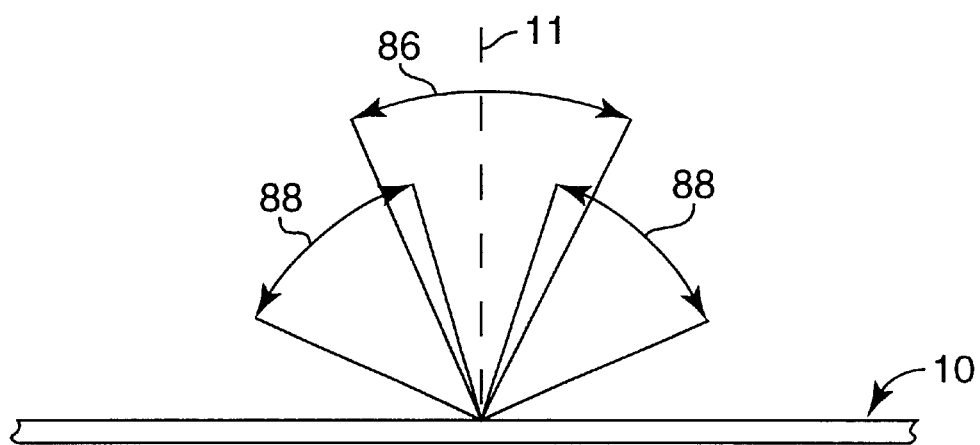

For oblique angle observation, the band edges shift towards the blue (shorter wavelengths) with increasing angle. By movement of band edges 80a, 80b, background light from curve 84 is substantially transmitted and light from foreground curve 82 becomes blocked by the color shifting film. FIG. 8a demonstrates how an observer sees the bright fluorescence from first colored portion 16 over angular range 86 and the bright fluorescence from second colored portion 18 over angular range 88.

In general, suitable articles 10 can include additional layers and features. For example, color shifting film 12 can include one or more regions that have been embossed with heat and/or pressure. The embossed regions are thinner than non-embossed neighboring regions and therefore have spectral transmission and reflection features that are blue-shifted relative to corresponding features of the non-embossed regions. The embossed regions can take the form of indicia in addition to the indicia 14 discussed above. As another example, the color shifting film 12 can contain or carry a microstructured relief pattern suitable for producing conventional holographic images. Such images can be used to obscure the indicia 14 at selected geometries. The relief pattern can be formed using known holographic embossing techniques into a suitable skin layer or coating on top of the color shifting film. The relief pattern man alternately be incorporated into a separate transparent sheet that is laminated to the color shifting film. Reference is made generally to U.S. Pat. No. 5,656,360 (Faykish et al.). Such a separate transparent sheet is preferably polymeric for ease of manufacture and for article integrity over operating temperature ranges. As yet another example, additional graphics, symbols, or other indicia in addition to indicia 14 discussed above can be applied to the article 10 by conventional printing onto color shifting film 12 or onto additional layer(s) laminated to film 12.

EXAMPLE

A representative article was constructed using the following component materials: 3M brand Radiant Color Film CM590 for color shifting film 12; Akzo Nobel AGBPP1804 orange fluorescent dye for colored portion 16; and Akzo Nobel AGBP0802 green fluorescent dye for colored portion 18. The different dyes were applied by hand to one side (designated the "back" side) of the color shifting film in complementary fashion to form a foreground (portion 16) and background (portion 18) of the word "HAPPY". Prior to application of the dyes to the film 12, a water-based primer (Akzo Nobel primer type WVL 02002) was applied to the back of film 12 to promote adhesion of the dyes to the film. No adhesive layer 20 was used. The dyes were then allowed to dry. The resulting coated film was flexible and had an overall thickness of: about 1.9 mils (50 $\mu$m) for the film 12 by itself; variable from about 2.1 to 7 mils (about 50 to 180 $\mu$m) on average for the film plus dye in the foreground regions; and variable from about 2.6 to 9 mils (about 65 to 230 $\mu$m) on average for the film plus dye in the background regions. Color nonuniformities varying from light green to nearly black were observed in the background portion. Lesser nonuniformities (different shades of orange) were observed from one letter to the next in the foreground portion. The nonuniformities appeared to be due to thickness nonuniformities in the dried dyes.

The article was placed back side down onto a sheet of white paper under ordinary office illumination. When viewed from the front at near normal incidence, green fluorescence was observed in regions of the background and orange fluorescence was observed at differing brightness levels in the foreground letters. As the viewing angle with respect to the normal was steadily increased, a first angle was reached where the orange fluorescence could not be seen but some green fluorescence could be seen. Next, a second angle was reached where substantially no orange or green fluorescence could be seen. Finally, at a third very shallow observation angle (about 80 degrees relative to the normal), the green fluorescence could still not be seen but the orange fluorescence was observed to be quite bright and quite uniform from one letter to the next.

Figure 9:
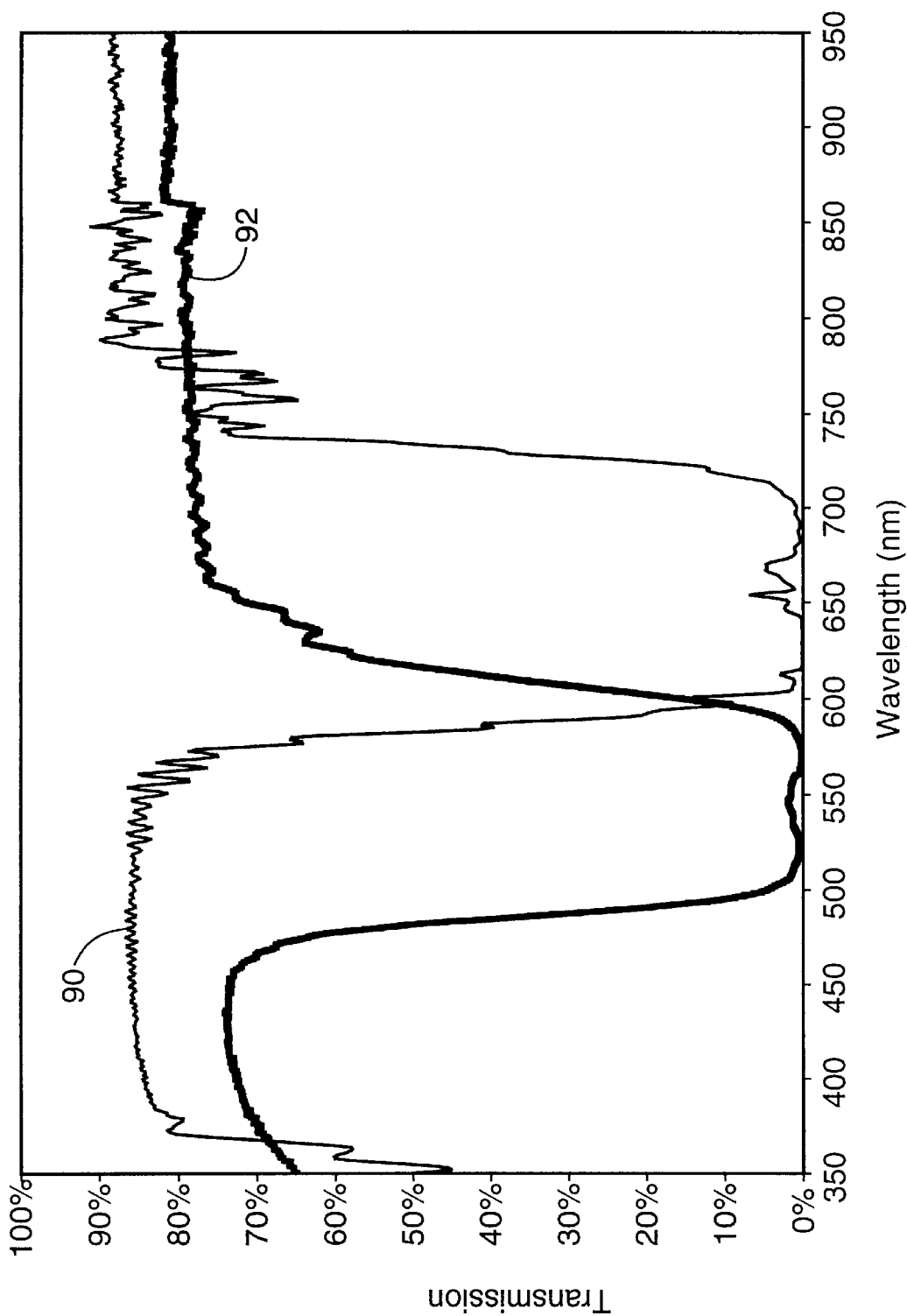
FIG. 9 is a graph of measured spectral transmission of a particular color shifting film at normal (0 degree) incidence and at 60 degrees incidence.
Figure 10:
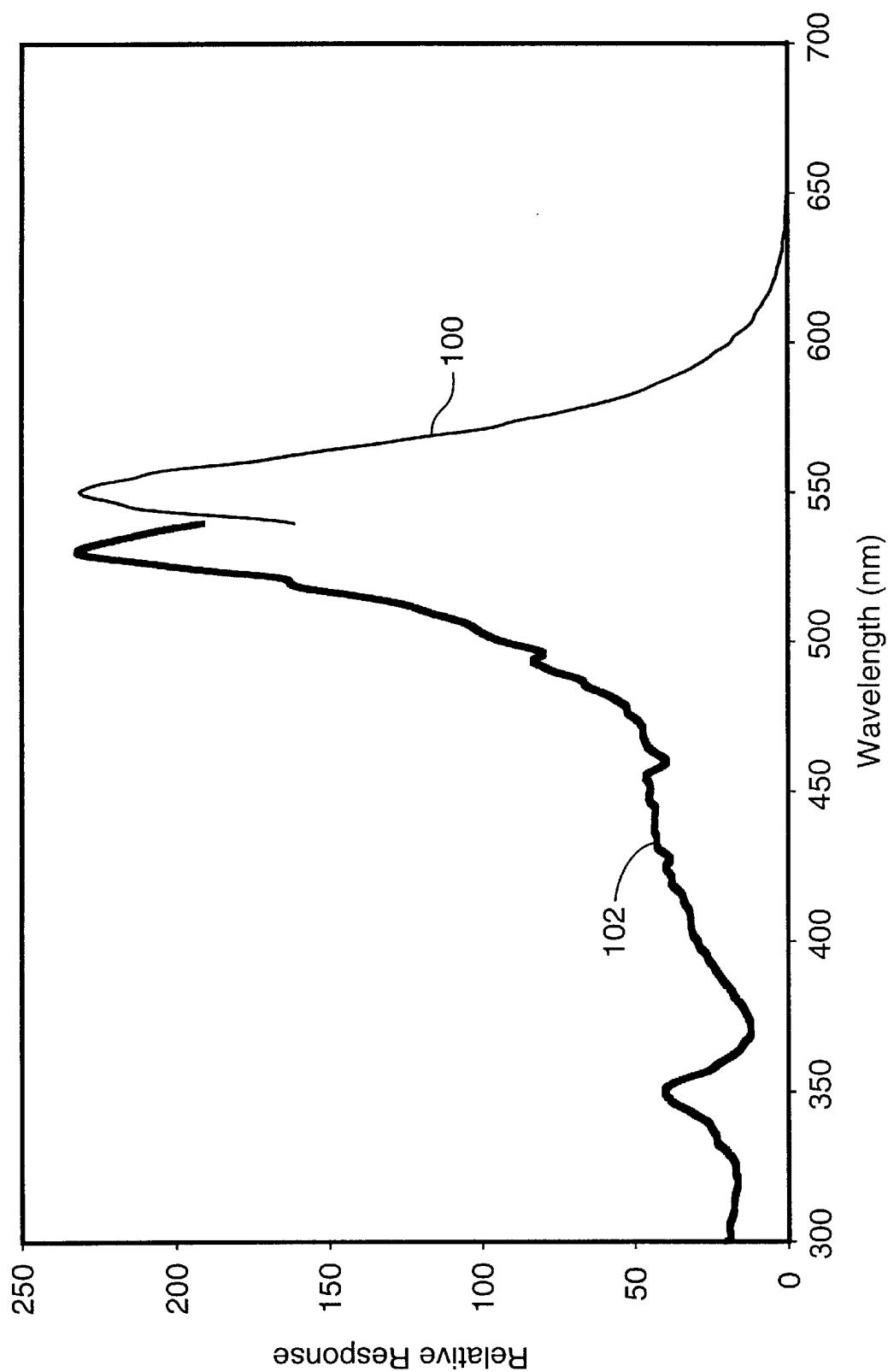
FIG. 10 is a graph of measured spectral properties of a particular orange fluorescent dye.
Figure 11:
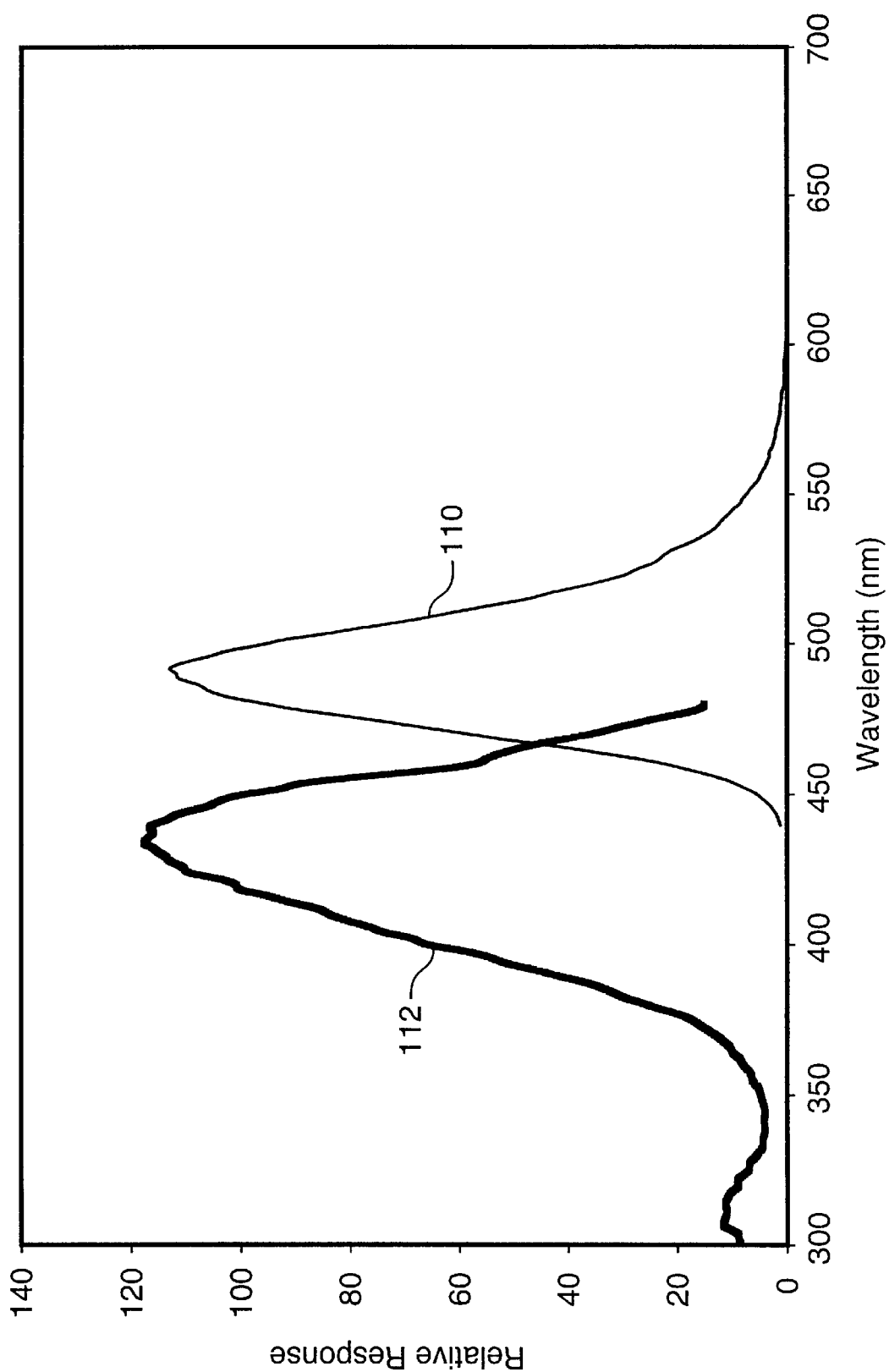
FIG. 11 is a graph of measured spectral properties of a particular green fluorescent dye.

The spectral properties of the color shifting film and of the orange and green fluorescent dyes used in the example were measured to explain the observed angular dependence of the image contrast. The transmission of a spare (uncoated) piece of the CM590 film was measured using a Perkin Elmer Lambda 19 RSA-PE19S spectrometer. FIG. 9 plots the measured percent transmission versus wavelength. Curve 90 was measured with unpolarized light at normal incidence to the film. Curve 92 is an average of p-polarized light and s-polarized light (i.e., light linearly polarized in the plane of incidence and perpendicular to the plane of incidence respectively) for an angle of 60 degrees from the normal direction. Note the wavelength shift of the reflection band and the good maintenance of the sharp band edges. FIG. 10 is data measured using a Perkin Elmer Model LSB50 Luminescence Spectrophotometer for the orange fluorescent dye. Curve 100 is the emission band and curve 102 is the excitation band for the dye. The two curves are plotted against relative response (in arbitrary units). Note that the excitation band 102 exists not only in the ultraviolet region but extends well into the visible region. In comparing FIGS. 9 and 10 note also that the CM590 film substantially transmits light in the excitation band 102 at normal angles and at oblique angles. FIG. 11 is data measured using a Perkin Elmer Model LSB50 Luminescence Spectrophotometer for the green fluorescent dye. Curve 110 is the emission band and curve 112 is the excitation band for the dye. The two curves are plotted against relative response (in arbitrary units). Note again that the excitation band 112 exists not only in the ultraviolet region but extends well into the visible region, and that the CM590 film substantially transmits light in the excitation band 102 at normal angles and at oblique angles. The normal incidence curve 90 for the color shifting film substantially transmits light in the emission band 110 of the green fluorescent dye, and also transmits light in the emission band 100 of the orange fluorescent dye but has a sharp band edge that appears to overlap with a substantial portion of emission band 100. At the 60 degree incidence angle, curve 92 has poor transmission in the green emission band 110 and poor transmission in the orange emission band 100. As the reflection band moves to even shorter wavelengths with even higher incidence angles, the right band edge of the reflection band crosses over the bulk of the emission band 100 to permit orange fluorescence to again be seen.

All patents and patent applications referred to, including those disclosed in the background of the invention, are hereby incorporated by reference. The present invention has now been described with reference to several embodiments thereof. It will be apparent to those skilled in the art that many changes can be made in the embodiments described without departing from the scope of the invention. Thus, the scope of the present invention should not be limited to the preferred structures and methods described herein, but rather by the broad scope of the claims which follow.

What is claimed is:

1. An article, comprising:
   a color shifting film; and
   an indicia layer disposed behind the color shifting film;
   wherein the indicia layer includes at least a first and second colored portion arranged as a foreground and a background of the indicia, the first colored portion comprising a first fluorescent colorant and the second colored portion comprising a second fluorescent colorant different from the first fluorescent colorant.

2. The article of claim 1, wherein the first and second fluorescent colorants have first and second emission bands respectively, and wherein at a first viewing angle the color shifting film substantially blocks transmission of light in the first emission band and substantially transmits light in the second emission band.

3. The article of claim 2, wherein at a second viewing angle the color shifting film substantially transmits light in the first emission band and substantially blocks light in the second emission band.

4. The article of claim 2, wherein at a second viewing angle the color shifting film substantially transmits light in the first and second emission bands.

5. The article of claim 1, wherein at least the first colored portion is printed on the color shifting film.

6. The article of claim 1, wherein at least the second colored portion is printed on the color shifting film.

7. The article of claim 6, wherein the first colored portion is also printed on the color shifting film, and the second colored portion is printed substantially continuously to extend over the first colored portion.

8. The article of claim 1, further comprising an adhesive layer.

9. The article of claim 8, wherein the adhesive layer is disposed to permit attachment of the article to a substrate.

10. The article of claim 8, wherein the adhesive layer comprises one of the first and second colored portions.

11. The article of claim 1, wherein the foreground comprises the first colored portion and the background comprises the second colored portion.

12. The article of claim 1, wherein the background comprises the first colored portion and the foreground comprises the second colored portion.

13. The article of claim 1, wherein the color shifting film is selected from the group consisting of a polarizer and a mirror.

14. The article of claim 1, further comprising a substantially white diffuse surface disposed behind the indicia.

15. The article of claim 1, wherein the first fluorescent colorant has an excitation band, and wherein the color shifting film substantially blocks transmission of light in the excitation band at a first angle and substantially transmits light in the excitation band at a second angle.

16. The article of claim 1, wherein the second fluorescent colorant has an excitation band, and wherein the color shifting film substantially blocks transmission of light in the excitation band at a first angle and substantially transmits light in the excitation band at a second angle.

17. The article of claim 1, further comprising additional indicia formed by at least one element selected from the group consisting of an embossed region of the color shifting film, a holographic element, and printed information.

* * * * *